(12) United States Patent
Li et al.

(10) Patent No.: US 7,267,908 B2
(45) Date of Patent: Sep. 11, 2007

(54) IN CYCLING STABILITY OF LI-ION BATTERY WITH MOLTEN SALT ELECTROLYTE

(75) Inventors: Wen Li, Ann Arbor, MI (US); Hiroki Awano, Shizuoka (JP); Gerald Perron, Boucherville (CA)

(73) Assignees: Toyota Technical Center USA, Inc., Ann Arbor, MI (US); Toyota Motor Corporation (JP); University de Montreal (CA)

( * ) Notice: Subject to any disclaimer, the term of this patent is extended or adjusted under 35 U.S.C. 154(b) by 0 days.

(21) Appl. No.: 11/214,159

(22) Filed: Aug. 29, 2005

(65) Prior Publication Data

US 2006/0147795 A1    Jul. 6, 2006

Related U.S. Application Data

(60) Provisional application No. 60/605,655, filed on Aug. 30, 2004.

(51) Int. Cl.
*H01M 4/58*     (2006.01)
*H01M 6/04*     (2006.01)

(52) U.S. Cl. .............. 429/231.95; 429/188; 429/231.1; 429/231.3

(58) Field of Classification Search ................ 429/188, 429/231.1, 231.3, 231.95
See application file for complete search history.

(56) References Cited

U.S. PATENT DOCUMENTS

| | | |
|---|---|---|
| 2006/0019167 A1 | 1/2006 | Li |
| 2006/0019168 A1 | 1/2006 | Li et al. |
| 2006/0068282 A1 | 3/2006 | Kishi et al. |
| 2006/0083986 A1 | 4/2006 | Li et al. |
| 2006/0088763 A1 | 4/2006 | Li et al. |
| 2006/0088767 A1 | 4/2006 | Li et al. |

*Primary Examiner*—Patrick Joseph Ryan
*Assistant Examiner*—Thomas H. Parsons
(74) *Attorney, Agent, or Firm*—Gifford, Krass, Gruh, Sprinkle, Anderson & Citkowski, P.C.

(57) ABSTRACT

An example battery according to an embodiment of the present invention includes a positive electrode, a negative electrode, and an electrolyte. The positive electrode comprises a positive active material, and has a positive electrode area and a positive electrode capacity. The negative electrode comprises a negative active material, and has a negative electrode area and a negative electrode capacity. The battery has an electrode area ratio equal to the positive electrode area divided by the negative electrode area, and an electrode capacity ratio equal to the positive electrode capacity divided by the negative electrode capacity. In an example battery, the electrode area ratio is at least approximately one, and/or the electrode capacity ratio is at least approximately one.

24 Claims, 5 Drawing Sheets

IN CYCLING STABILITY OF LI-ION BATTERY WITH MOLTEN SALT ELECTROLYTE

REFERENCE TO RELATED APPLICATIONS

This application claims priority to U.S. provisional patent application Ser. No. 60/605,655, filed Aug. 30, 2004, the content of said application being incorporated herein by reference in its entirety.

FIELD OF THE INVENTION

The present invention relates to energy storage devices, in particular to rechargeable batteries such as lithium-ion (Li-ion) and lithium sulfur (Li—S) batteries.

BACKGROUND OF THE INVENTION

Safety is a key issue for Li-ion battery applications, particularly automobile applications. Conventional organic electrolyte in a Li-ion battery typically has high vapor pressure, and is flammable. Molten salt electrolytes typically have high melting points and low vapor pressures, therefore they have potentially higher safety than organic electrolytes.

A Li-ion battery with a molten salt electrolyte may also have a higher energy or power density, compared to a conventional Li-ion battery. However, the cycling stability of molten salt electrolyte Li-ion batteries is a serious problem.

SUMMARY OF THE INVENTION

An example battery according to an embodiment of the present invention comprises a positive electrode, a negative electrode, and an electrolyte. The positive electrode comprises a positive active material, and has a positive electrode area and a positive electrode capacity. The negative electrode comprises a negative active material, and has a negative electrode area and a negative electrode capacity. The battery has an electrode area ratio equal to the positive electrode area divided by the negative electrode area, the electrode area ratio being at least approximately one, and an electrode capacity ratio equal to the positive electrode capacity divided by the negative electrode capacity, the electrode capacity ratio being at least approximately one. The electrolyte is a molten salt electrolyte including a source of ions, depending on the type of battery. For a lithium ion battery, the source of ions may be a lithium salt. The negative active material has a particle size of approximately one micron or greater.

The cycling stability of a lithium ion battery having a molten salt electrolyte can be increased using one or more of the following improvements: a negative active material particle size of greater than approximately one micron, a capacity ratio (equal to the positive electrode (cathode) capacity divided by the negative electrode (anode) capacity of at least approximately one, and an electrode area ratio (equal to a positive electrode area divided by a negative electrode area) of at least approximately one.

DETAILED DESCRIPTION OF THE INVENTION

Figure 1A:
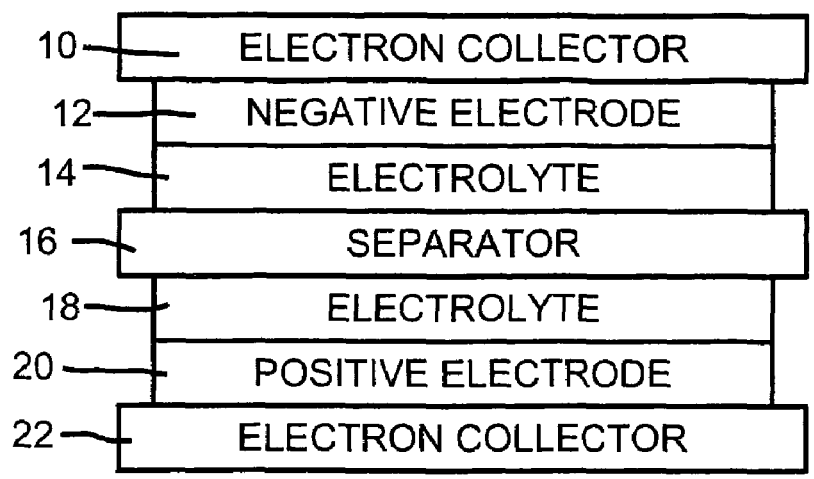
FIGS. 1A and 1C are schematics of a battery.

An example battery according to an embodiment of the present invention comprises a positive electrode, a negative electrode, and an electrolyte. The positive electrode comprises a positive active material, and has a positive electrode area and a positive electrode capacity. The negative electrode comprises a negative active material, and has a negative electrode area and a negative electrode capacity. The battery has an electrode area ratio equal to the positive electrode area divided by the negative electrode area, the electrode area ratio being at least approximately one, and an electrode capacity ratio equal to the positive electrode capacity divided by the negative electrode capacity, the electrode capacity ratio being at least approximately one. The electrolyte is a molten salt electrolyte including a source of ions, depending on the type of battery. For a lithium ion battery, the source of ions is a lithium salt or other source of lithium ions.

The negative active material has a particle size of approximately one micron or greater. In other examples, the negative active material has a particle size of approximately three microns or greater, or may be approximately three microns. The particles may be substantially monodisperse in size, or may have an appreciable size distribution, in which case the particle size is an average size of the particle size distribution, such as the mean size.

In an example battery, the electrode capacity ratio is approximately one. The electrode capacity ratio is the ratio of the positive electrode capacity to the negative electrode capacity. The capacity of an electrode is often given as a charge-time product per unit area. The units of charge and time used are not important in the ratio calculation. The capacity of an electrode is equal to the capacity per unit area multiplied by the electrode area. Hence, for similar area of the two electrodes, the capacity ratio is equal to the ratio of the capacitances per unit area of the two electrodes.

In an example battery, the molten salt electrolyte comprises an onium. Other example molten salt electrolyte components are given elsewhere.

In the case of lithium ion batteries, the negative active material may comprise lithium titanate, or other compound capable of receiving and giving up lithium ions. The negative electrode may further include an electron conductive material, such as a carbon-containing material (such as carbon), and a binder. The negative electrode may take the form of a layer disposed on a first electron collector. The positive active material similarly may comprise compound capable of receiving and giving up lithium ions, an electron conductive material (which may be the same or different as the electron conductive material in the negative electrode), and a binder, and may take the form of a layer disposed on a second electron collector.

In a lithium-ion battery and similar rechargeable batteries, the term anode is conventionally used for the negative electrode, and the term cathode is conventionally used for the positive electrode. These designations are technically correct only for the battery in a discharge cycle, however these designations are widely used in the literature and may be used herein. The term battery is used to refer to a device including one or more electrochemical cells.

An example Li-ion battery comprises a positive electrode, a negative electrode, separator, molten salt electrolyte (an electrolyte including a molten salt), and first and second electron collectors supporting the positive electrode and negative electrode respectively, where the positive and negative electrodes each comprise a binder, electron conducting material, and positive or negative active material, respectively. The active materials allow lithium ion insertion and extraction (such as reversible intercalation) when the battery is charged or discharged. An example negative active material is lithium titanium oxide, for example as represented by $Li_4Ti_5O_{12}$.

The molten salt electrolyte can include an onium, such as an ammonium, a phosphonium, an oxonium, a sulfonium, an amidinium, an imidazolium, a pyrazolium, and a low basicity anion, such as $PF_6^-$, $BF_4^-$, $CF_3SO_3^-$, $(CF_3SO_2)N^-$, $(FSO_2)_2N^-$. The molten salt electrolyte may also include $Y^+N^-(-SO_2Rf^2)(-XRf^3)$, where $Y^+$ is a cation selected from the group consisting of an imidazolium ion, an ammonium ion, a sulfonium ion, a pyridinium, a(n) (iso)thiazolyl ion, and a(n) (iso) oxazolium ion, which may be optionally substituted with $C_{1-10}$ alkyl or $C_{1-10}$ alkyl having ether linkage, provided that said cation has at least one substituent of $-CH_2Rf^1$ or $-OCH_2Rf^1$ (where Rf is $C_{1-10}$ polyfluoroalkyl); $Rf^2$ and $Rf^3$ are independently $C_{1-10}$ perfluorophenyl or may together be $C_{1-10}$ perfluoroalkylene; and X is $-SO_2-$ or $-CO-$.

However, continuous gas generation was found when a Li-ion battery with a molten salt electrolyte was cycled, especially for a cell with a high voltage cathode. Experimental results showed that the gases came from decomposition of the molten salt electrolyte. The slow decomposition of the molten salt electrolyte seriously affected the cycling stability of the molten salt type Li-ion battery. Therefore, solving the problem of electrolyte decomposition is important for the development of improved battery systems.

FIG. 1A shows a possible structure for a molten salt type Li-ion battery. The figure is a cross-section or edge view of a layered structure. The battery comprises first electron collector 10, negative electrode (or anode) 12, electrolyte layers 14 and 18, separator 16, positive electrode (or cathode 20), and second electron collector 22. The positive electrode includes a positive active material, an electron conductive material, and a binder. The negative electrode includes a negative active material, an electron conductive material, and a binder.

Figure 1B:
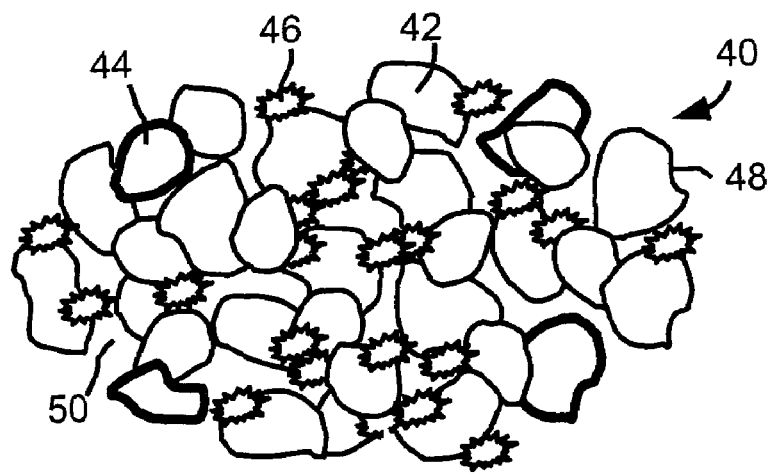
FIG. 1B is a schematic showing the problem of molten salt electrolyte decomposition in a battery.

FIG. 1B shows a schematic representation of molten salt electrolyte decomposition in an electrode layer. The electrode (a portion shown at 40) comprises active material particles 42, and electron conductive material particles 44 (represented with thicker walls for illustrative clarity). The particle surfaces, such as 48, may support a layer of binder. Inter-particle gaps, such as 50, are filled with electrolyte. Electrolyte decomposition at the surface of a particle is represented by jagged shape 46.

Figure 1C:
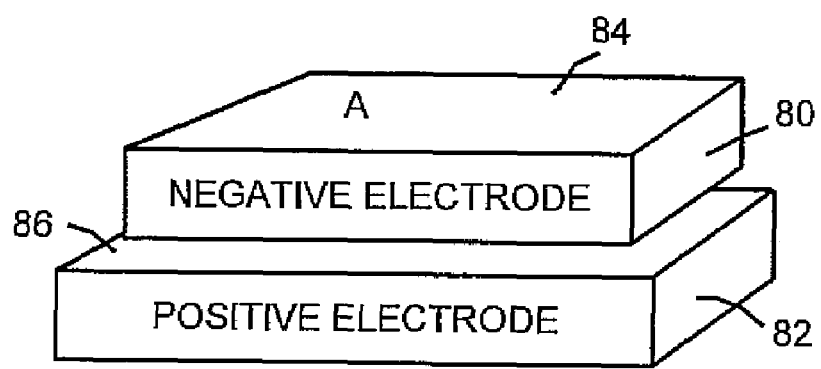

FIG. 1C is a simplified representation of a battery having a negative electrode 80 and a positive electrode 82. The electrodes of the battery are in the form of a sheet or layer, having a thickness much less than the length or width. The area is in this case the product of the length and width of the sheet or layer. In this example, the negative electrode area is the area 84 labeled A, and the positive electrode area is shown partially at 84. The electrodes are generally parallel and spaced apart. In some battery configurations, only a separator separates the electrodes.

The structure of the electrodes, and particle size of the negative material, greatly affected cycling stability, which is related to decomposition of the molten salt electrolyte.

Figure 2:
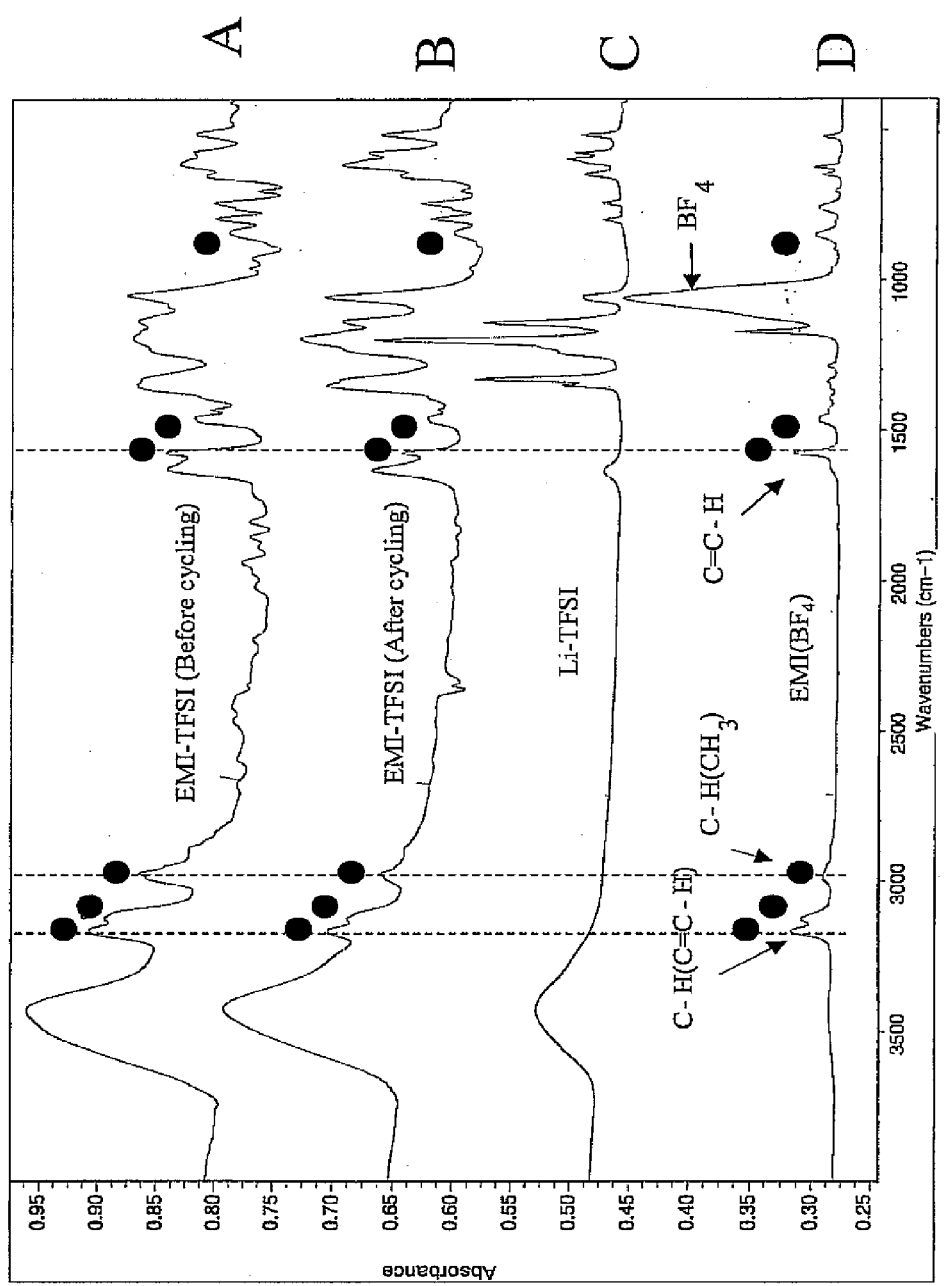
FIG. 2 shows IR spectra of molten salt electrolyte decomposition after cycling a battery.

Cycling experiments were carried out using a Li-ion battery, where the molten salt electrolyte comprised ethyl-1-methyl-3-imidazolium-bis-fluoro-sulfonylimide (EMI-FSI) with lithium-bis-trifluoromethan-sulfonylimide (LiTFSI) as a lithium ion source. Infrared spectra (such as shown in FIG. 2) showed that the EMI cation in the molten salt electrolyte decomposed after the battery was cycled. The chemical compounds from the decomposition of the EMI anion were identified by XPS, GC-MS, and included $S=C=O$, $S=C=S$, $HC(=O)-CF_3$, and similar fragments.

FIG. 2 illustrates four IR spectra labeled A, B, C, and D respectively. Spectrum A, at the top of the figure, is the IR spectrum of the EMI-TFSI molten salt before cycling, B represents the IR spectrum of the EMI-TFSI molten salt after cycling, C represents the IR spectrum of the anion (Li-TFSI), D (the spectrum at the bottom of the figure) represents the IR spectrum of the cation (EMI-$BF_4$). The filled circles indicate peaks associated with electrolyte decomposition, and this decomposition is believed to be responsible for the reduction in cycling stability. In the examples below, poor cycling stability is associated with a fall in cathode capacity as the battery is repeatedly cycled through charge and discharge.

Figure 3:
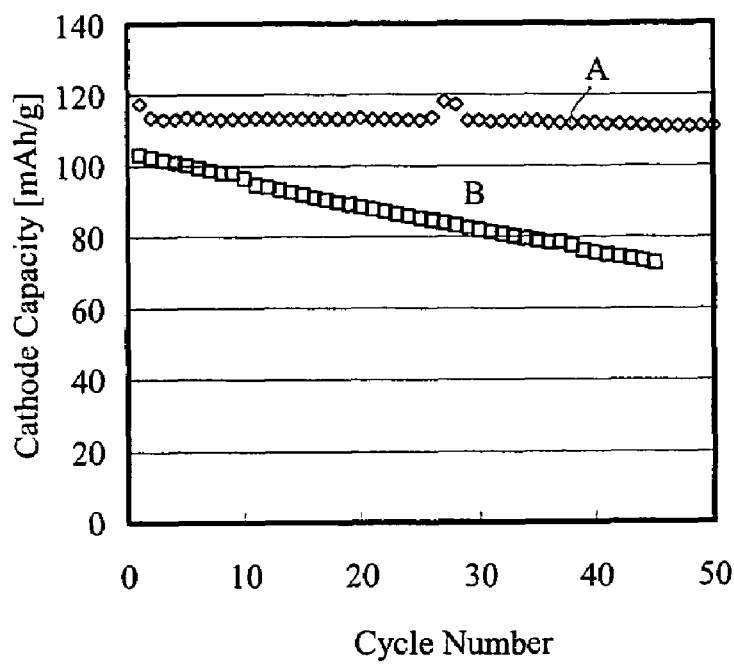
FIG. 3 shows the effect of particle size of negative active material on cycling stability, in this example using a $Li_4Ti_5O_{12}$ negative active material in a Li-ion battery with molten salt electrolyte, for (A) 3 microns and (B) 50 nm.

FIG. 3 shows the cycling stability results of two Li-ion batteries with different $Li_4Ti_5O_{12}$ particle sizes. The two batteries were made in the same way except for the particle size of the negative materials. The battery with a particle size diameter of 3 μm (3 microns) show good cycling stability (data represented by the diamonds labeled A) compared to the battery with the particle size diameter of 50 nm (data represented by the squares labeled B).

Figure 4:
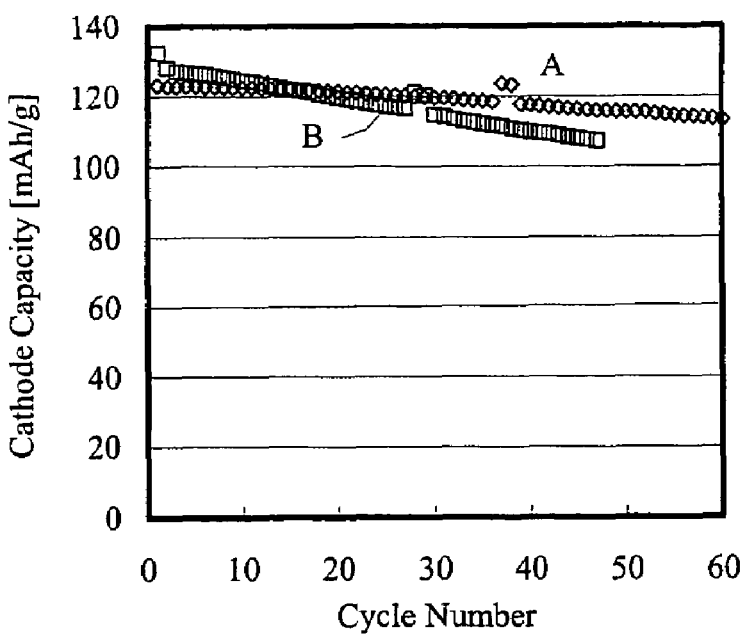
FIG. 4 shows the effect of electrode capacity ratio (C/A) of positive electrode (cathode) capacity to negative electrode (anode) capacity on cycling stability, for (A) C/A=1.0 and (B) C/A=0.5.

FIG. 4 shows the effect of capacity ratio (C/A) of cathode to anode on cycling stability for two batteries; A (data represented by diamonds) C/A=1.0, and B (data represented by squares) C/A=0.5. The two batteries were made in the same way, except for the capacity ratio. The battery with the C/A of 1.0 showed improved cycling stability compared to that with the lower C/A ratio.

The C/A ratio may also be referred to as electrode capacity ratio, equal to the positive electrode capacity divided by the negative electrode capacity, the electrode capacity ratio being at least approximately one.

Without wishing to be limited by any suggested explanation for this effect, a possible reason for this effect is a build-up of electrons in the positive electrode during operation of the battery, if the positive electrode capacity is less than the negative electrode capacity. Hence, improved performance is expected as long as the electrode capacity ratio is approximately one or greater.

Figure 5:
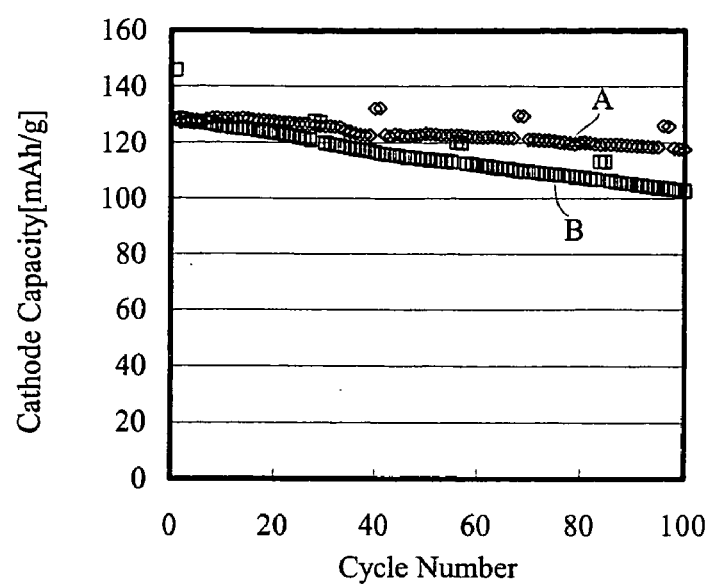
FIG. 5 shows the effect of electrode area ratio (Ca/Aa) of cathode to anode on cycling stability, (A) Ca/Aa=1.0 and (B) Ca/Aa=0.8.

FIG. 5 shows the effect of electrode area ratio (Ca/Aa) of cathode to anode on cycling stability; A (data represented by diamonds) Ca/Aa=1.0, and B (data represented by squares) Ca/Aa=0.8. The two types of batteries were made in the same way except for the area ratio. The battery with the Ca/Aa of 1.0 showed good cycling stability compared to that with the lower C/A ratio.

The C/A ratio can also be called the electrode area ratio, equal to the positive electrode area divided by the negative electrode area, and these results show improvement for the electrode area ratio being at approximately one. An electrode area ratio of greater than one infers that the positive electrode area is greater than the negative electrode area.

Without wishing to be limited by any suggested explanation for this effect, a possible reason for this effect is a concentration of electric lines of force near the outer edges of the positive electrode if the positive electrode is smaller in area than the negative electrode. Hence, improved performance is expected as long as the electrode area ratio is approximately one or greater. An electrode capacity ratio of greater than one infers that the positive electrode capacity is greater than the negative electrode capacity.

EXAMPLE 1

The positive electrode was fabricated by intimately mixing 85 wt % $LiCoO_2$ powder, 10 wt % carbon powder, and 5 wt % solvent of polyvinylidene fluoride in N-methylpyrrolidone. To form a positive electrode film, the mixed slurry was cast onto aluminum foil using a doctor blade and dried at 80° C. for 30 minutes. The density of the layer was about 6 mg/cm$^2$. The coating area was 30 cm$^2$.

The negative electrode was fabricated by intimately mixing 85 wt % $Li_4Ti_5O_{12}$ (particle size of 3 μm) powder, 10 wt % carbon powder, and 5 wt % solvent of polyvinylidene fluoride in N-methylpyrrolidone. To form a negative electrode film, the mixed slurry was cast onto aluminum foil using a doctor blade and dried at 80° C. for 30 minutes. The density of the layer was about 8 mg/cm$^2$. The coating area was 36 cm$^2$.

The positive electrode sheet, a micro-porous polypropylene film separator, and the negative electrode sheet were stacked, and placed in aluminum laminate pack.

A certain amount of molten salt electrolyte was added in to the laminate pack. Here, ethyl-1-methyl-3-imidazolium-bis-fluoro-sulfonylimide (EMI-FSI) with lithium-bis-trifluoromethan-sulfonylimide (LiTFSI) was used as the molten salt electrolyte. The aluminum laminate pack was sealed in a vacuum to give a soft package battery.

EXAMPLE 2

Negative electrode was fabricated by intimately mixing 85 wt % $Li_4Ti_5O_{12}$ (particle size of 50 nm) powder, 10 wt % carbon powder, and 5 wt % solvent of polyvinylidene fluoride in N-methylpyrrolidone. To form a negative electrode film, the mixed slurry was cast onto aluminum foil using a doctor blade and dried at 80° C. for 30 minutes. The density of the layer was about 6 mg/cm$^2$. The coating area was 36 cm$^2$. Other details are the same as Example 1.

EXAMPLE 3

Negative electrode was fabricated by intimately mixing 85 wt % $Li_4Ti_5O_{12}$ (particle size of 50 nm) powder, 10 wt % carbon powder, and 5 wt % solvent of polyvinylidene fluoride in N-methylpyrrolidone. To form a negative electrode film, the mixed slurry was cast onto aluminum foil using a doctor blade and dried at 80° C. for 30 minutes. The density of the layer was about 8 mg/cm$^2$. The coating area was 30 cm$^2$. Other details are the same as Example 1.

Reference 1

Negative electrode was fabricated by intimately mixing 85 wt % $Li_4Ti_5O_{12}$ (particle size of 50 nm) powder, 10 wt % carbon powder, and 5 wt % solvent of polyvinylidene fluoride in N-methylpyrrolidone. To form a negative electrode film, the mixed slurry was cast onto aluminum foil using a doctor blade and dried at 80° C. for 30 minutes. The density of the layer was about 8 mg/cm$^2$. The coating area was 36 cm$^2$. Other details are the same as Example 1

Evaluation Conditions

The battery was charged and discharged under the following conditions:

electric current density: 0.3 mA/cm$^2$;
charge-termination voltage: 2.6 V;
discharge-termination voltage: 1.5V; and
number of cycles: 100 cycles.

The results show that the use of certain particle sizes of $Li_4Ti_5O_{12}$ for a Li-ion battery with a molten salt electrolyte provides improved battery performance. For example, a particle size of the order of micrometers can be used. For example, the particle size can be greater than approximately 50 nm, such as approximately one micron, or greater than approximately one micron, such as approximately 3 microns, or greater than approximately 3 microns.

One probable advantage of the larger particle size is to reduce the active surface area, so as to reduce the decomposition rate of the electrolyte.

Hence, an improved electrode structure design for a lithium-ion battery according to an embodiment of the present invention includes a capacity ratio (C/A) of cathode capacity to anode (such as $Li_4Ti_5O_{12}$) capacity, and area ratio (Ca/Aa) of cathode area to anode area (for example, with a molten salt electrolyte such as described herein), where the capacity ratio and area ratio are both approximately 1.0. In other examples, the capacity ratio can be approximately 1.0 or greater, and/or the area ratio can be approximately 1.0 or greater.

Hence, the particle size of negative material as well as the structure of the electrodes (such as the capacity ratio of cathode to anode and area ratio of cathode to anode) may greatly affect cell cycle performance. The cycle life of a battery, such as a Li-ion battery, can be greatly improved. Improved designs for the structure of the electrodes, and anode particle size in a Li-ion battery (for example, one having a $Li_4Ti_5O_{12}$ anode and a molten salt electrolyte, such as described above) can greatly improve battery cycle life.

The thickness of an electrode layer can be varied to adjust the electrode capacity. For example, if the positive electrode has a lower capacity per unit volume than the negative electrode, then the positive electrode thickness, and hence the volume, can be correspondingly increased. Hence, and improved battery has an electrode thicknesses chosen to approximately equalize the electrode capacities, or to ensure the electrode capacity of the positive electrode is approximately equal to or greater than the negative electrode. Similarly, the proportion of active material in an electrode can be correspondingly varied to equalize electrode capacities, or to ensure the positive electrode capacity is greater than or equal to the negative electrode capacity. The electrode thickness and/or proportion of active materials can be adjusted in cases where a positive and negative electrode of similar thickness and/or proportion of active material would have different electrode capacities.

Batteries according to examples of the present invention include a molten salt electrolyte. The term molten salt electrolyte is used herein to represent an electrolyte including one or more molten salts as a significant component of the electrolyte, for example more than 50% of the electrolyte. A molten salt electrolyte is an electrolyte comprising one or more salts, that is at least in part molten (or otherwise liquid) at the operating temperatures of the battery. A molten salt electrolyte can also be described as a molten, non-aqueous electrolyte, as an aqueous solvent is not required, or as an ionic liquid. Molten salt electrolytes which may be used in embodiments of the invention are described in U.S. Pat. No. 4,463,071 to Gifford, U.S. Pat. No. 5,552,241 to Mamantov et al., U.S. Pat. No. 5,589,291 to Carlin et al., U.S. Pat. No. 6,326,104 to Caja et al., U.S. Pat. No. 6,365,301 to Michot, and U.S. Pat. No. 6,544,691 to Guidotti.

Example molten salts include those having an aromatic cation (such as an imidazolium salt or a pyridinium salt), an aliphatic quaternary ammonium salt, or a sulfonium salt. The molten salt electrolyte used may include an onium, such as an ammonium, a phosphonium, an oxonium, a sulfonium, an amidinium, an imidazolium, a pyrazolium, and an anion, such as $PF_6^-$, $BF_4^-$, $CF_3SO_3^-$, $(CF_3SO_2)_2N^-$, $(FSO_2)_2N^-$, $(C_2F_5SO_2)_2N^-$, $Cl^-$ and $Br^-$. A molten salt electrolyte used in an example of the present invention may include $Y^+N^-(-SO_2Rf^2)(-XRf^3)$, where $Y^+$ is a cation selected from the group consisting of an imidazolium ion, an ammonium ion, a sulfonium ion, a pyridinium, a(n) (iso)thiazolyl ion, and a(n) (iso) oxazolium ion, which may be optionally substituted with $C_{1-10}$ alkyl or $C_{1-10}$ alkyl having ether linkage, provided that said cation has at least one substituent of $-CH_2Rf^1$ or $-OCH_2Rf^1$ (where $Rf^1$ is $C_{1-10}$ polyfluoroalkyl); $Rf^2$ and $Rf^3$ are independently $C_{1-10}$ perfluorophenyl or may together from $C_{1-10}$ perfluoroalkylene; and X is $-SO_2-$ or $-CO-$.

Molten salts include salts having an aromatic cation (such as an imidazolium salt or a pyridinium salt), aliphatic quaternary ammonium salts, and sulfonium salts.

Imidazolium salts include salts having a dialkylimidazolium ion, such as a dimethylimidazolium ion, an ethylmethylimidazolium ion, a propylmethylimidazolium ion, a butylmethylimidazolium ion, a hexylmethylimidazolium ion or an octylmethylimidazolium ion, or a trialkylimidazolium ion such as a 1,2,3-trimethylimidazolium ion, a 1-ethyl-2,3-dimethylimidazolium ion, a 1-butyl-2,3-dimethylimidazolium ion or a 1-hexyl-2,3-dimethylimidazolium ion. Imidazolium salts include ethylmethylimidazolium tetrafluoroborate (EMI-$BF_4$), ethylmethylimidazolium trifluoromethanesulfonylimide (EMI-TFSI), propylmethylimidazolium tetrafluoroborate, 1,2-diethyl-3-methylimidazolium trifluoromethanesulfonylimide (DEMI-TFSI), and 1,2,4-triethyl-3-methylimidazolium trifluoromethanesulfonylimide (TEMI-TFSI).

Pyridinium salts include salts having an alkyl pyridinium ion, such as a 1-ethylpyridinium ion, a 1-butylpyridinium ion or a 1-hexylpyridinium ion. Pyridinium salts include 1-ethylpyridinium tetrafluoroborate and 1-ethylpyridinium trifluoromethanesulfonylimide. Ammonium salts include trimethylpropylammonium trifluoromethanesulfonylimide (TMPA-TFSI), diethylmethylpropylammonium trifluoromethanesulfonylimide, and 1-butyl-1-methylpyrrolidinium trifluoromethanesulfonylimide. Sulfonium salts include triethylsulfonium trifluoromethanesulfonylimide (TES-TFSI).

In a secondary battery operating through the migration of cations, the electrolyte typically contains a cation source, providing cations according to the type of battery. In the case of a lithium ion battery, the cation source can be a lithium salt. Lithium salts in the electrolyte of a lithium-ion battery may include one or more of the following: $LiPF_6$, $LiAsF_6$, $LiSbF_6$, $LiBF_4$, $LiClO_4$, $LiCF_3SO_3$, $Li(CF_3SO_2)_2N$, $Li(C_2F_5SO_2)_2N$, $LiC_4F_9SO_3$, $Li(CF_3SO_2)_3C$, $LiBPh_4$, LiBOB (lithium bis(oxalato)borate), and $Li(CF_3SO_2)(CF_3CO)N$, and the like. Examples of the present invention can include rechargeable batteries using ions other than lithium, such as other alkali metal or other cation based batteries, in which case an appropriate salt is used. For example, the molten salt of a potassium-ion battery may include $KPF_6$ or other potassium-ion providing compound.

The active material of the positive electrode, or cathode, can be a material allowing cation insertion and release. In the case of a lithium ion battery, the cathode active material can be a lithium composite oxide, such as a lithium metal oxide (an oxide of lithium and at least one other metal species). Example lithium composite oxides include Li—Ni-containing oxides (such as $Li_xNiO_2$), $Li_x(Ni,Co)O_2$), Li—Mn-containing oxides (such as $Li_xMnO_2$, $Li_xMn_2O_4$, $Li_xNi_{0.5}Mn_{1.5}O_4$, and other lithium manganese nickel oxides), and Li—Co-containing oxides (such as $Li_xCoO_2$), other lithium transition metal oxides, lithium metal phosphates (such as (such as $LiCoPO_4$ and fluorinated lithium metal phosphates such as $Li_2CoPO_4F$), and other lithium metal chalcogenides, where the metal can be a transition metal. Lithium composite oxides include oxides of lithium and one or more transition metals, and oxides of lithium and one or more metals selected from the group consisting of Co, Al, Mn, Cr, Fe, V, Mg, Ti, Zr, Nb, Mo, W, Cu, Zn, Ga, In, Sn, La and Ce. The cathode active material may by nano-structured, for example in the form of nanoparticles having a mean diameter less than one micron.

The negative electrode (anode) comprises a negative active material, and (optionally) an electron conductive material and a binder. The negative electrode may be formed in electrical communication with an electron collector. The negative active material may be carbon based, such as graphitic carbon and/or amorphous carbon, such as natural graphite, mesocarbon microbeads (MCMBs), highly ordered pyrolytic graphite (HOPG), hard carbon or soft carbon, or a material comprising silicon and/or tin, or other components. The negative electrode may be a lithium titanate, such as $Li_4Ti_5O_{12}$.

Rechargeable batteries according to examples of the present invention include those based on any cation that can be reversibly stored (for example, inserted or intercalated) and released. Cations may include positive ions of alkali metals such as lithium, sodium, potassium, and cesium; alkaline earth metals such as calcium and barium; other metals such as magnesium, aluminum, silver and zinc; and hydrogen. In other examples, cations may be ammonium ions, imidazolium ions, pyridinium ions, phosphonium ions, sulfonium ions, and derivatives thereof, such as alkyl or other derivatives of such ions.

Electron conductive materials which may be used in electrodes of batteries according to examples of the present invention may comprise a carbon-containing material, such as graphite. Other example electron-conductive materials include polyaniline or other conducting polymer, carbon fibers, carbon black (or similar materials such as acetylene black, or Ketjen black), and non-electroactive metals such as cobalt, copper, nickel, other metal, or metal compound. The electron conducting material may be in the form of particles (as used here, the term includes granules, flakes, powders and the like), fibers, a mesh, sheet, or other two or three-dimensional framework. Electron conductive materials also include oxides such as $SnO_2$, $Ti_4O_7$, $In_2O_3/SnO_2$ (ITO), $Ta_2O_5$, $WO_2$, $W_{18}O_{49}$, $CrO_2$ and $Tl_2O_3$, carbides represented by the formula C (where M is a metal, such as WC, TiC and TaC), carbides represented by the formula $M_2C$, metal nitrides, and metallic tungsten An example battery may further include electrical leads and appropriate packaging, for example a sealed container providing electrical contacts in electrical communication with the first and second current collectors.

An electron collector, also known as a current collector, can be an electrically conductive member comprising a metal, conducting polymer, or other conducting material. The electron collector may be in the form of a sheet, mesh, rod, or other desired form. For example, an electron collector may comprise a metal such as Al, Ni, Fe, Ti, stainless steel, or other metal or alloy. The electron collector may have a protective coating to reduce corrosion, for example a protection layer comprising tungsten (W), platinum (Pt), titanium carbide (TiC), tantalum carbide (TaC), titanium oxide (for example, $Ti_4O_7$), copper phosphide ($Cu_2P_3$), nickel phosphide ($Ni_2P_3$), iron phosphide (FeP), and the like. An adhesion promoter can be used to promote adhesion of an electrode to an electron collector.

One or both electrodes may further include a binder. The binder may comprise one or more inert materials, for the purpose of improving the mechanical properties of the electrode, facilitating electrode manufacture or processing, or other purpose. Example binder materials include polymers, such as polyethylene, polyolefins and derivatives thereof, polyethylene oxide, acrylic polymers (including polymethacrylates), synthetic rubber, and the like. Binders also include fluoropolymers such as polyvinylidene fluoride (PVDF), polytetrafluoroethylene (PTFE), poly(vinylidene fluoride-hexafluoropropylene) copolymers (PVDF-HFP), and the like. Binder materials may include PEO (poly (ethylene oxide), PAN (polyacrylonitrile), CMC (carboxy methyl cellulose), SBR (styrene-butadiene rubber), or a mixture of compounds, including composite materials, copolymers, and the like.

Though examples discussed above refer to molten salt electrolytes, similar approaches may also be used to reduce decomposition of electrolyte components in batteries having organic solvents, such as organic carbonates, or electrolytes comprising both organic solvents and molten salts.

A battery may further comprise a housing, and a separator between the positive and negative electrodes. Batteries may include one or more separators, located between the negative electrode and positive electrode for the purpose of preventing direct electrical contact (a short circuit) between the electrodes. A separator can be an ion-transmitting sheet, for example a porous sheet, film, mesh, or woven or non-woven cloth, fibrous mat (cloth), or other form. The separator is optional, and a solid electrolyte may provide a similar function. A separator may be a porous or otherwise ion-transmitting sheet, including a material such as a polymer (such as polyethylene, polypropylene, polyethylene terephthalate, methyl cellulose, or other polymer), sol-gel material, ormosil, glass, ceramic, glass-ceramic, or other material. A separator may be attached to a surface of one or both electrodes.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having described our invention, we claim:

1. A rechargeable battery, comprising
a positive electrode, including a positive active material, the positive electrode having a positive electrode area and a positive electrode capacity;
a negative electrode, including a negative active material, the negative electrode having a negative electrode area and a negative electrode capacity; and
an electrolyte, the electrolyte being a molten salt electrolyte including a source of ions;
the battery having an electrode area ratio equal to the positive electrode area divided by the negative electrode area, the electrode area ratio being at least approximately one,
the battery having an electrode capacity ratio equal to the positive electrode capacity divided by the negative electrode capacity, the electrode capacity ratio being at least approximately one.

2. The battery of claim 1, wherein the source of ions is a lithium salt, the ions being lithium ions, the battery being a rechargeable lithium ion battery.

3. The battery of claim 1, wherein the negative active material has a particle size of approximately one micron or greater.

4. The battery of claim 1, wherein the negative active material has a particle size of approximately three microns or greater.

5. The battery of claim 1, wherein the negative active material has a particle size of approximately three microns.

6. The battery of claim 1, wherein the electrode capacity ratio is approximately one.

7. The battery of claim 1, wherein the electrode area ratio is approximately one.

8. The battery of claim 1, wherein the molten salt electrolyte comprises an onium.

9. The battery of claim 1, wherein the molten salt electrolyte comprises a sulfonium salt.

10. The battery of claim 1, wherein the negative active material comprises lithium titanate.

11. The battery of claim 1, wherein the negative electrode further includes an electron conductive material.

12. The battery of claim 11, wherein the electron conductive material is a carbon-containing material.

13. A battery, comprising:
a positive electrode, including a positive active material, the positive electrode having a positive electrode area and a positive electrode capacity;
a negative electrode, including a negative active material, the negative electrode having a negative electrode area and a negative electrode capacity; and
an electrolyte, the electrolyte comprising a molten salt and a lithium ion source,
the battery being a rechargeable lithium-ion battery,
the battery having an electrode area ratio equal to the positive electrode area divided by the negative electrode area, the electrode area ratio being at least approximately one,
the battery having an electrode capacity ratio equal to the positive electrode capacity divided by the negative electrode capacity, the electrode capacity ratio being at least approximately one.

14. The apparatus of claim 13, wherein the lithium ion source is a lithium salt.

15. The battery of claim 13, wherein the negative active material is a lithiated transition metal oxide.

16. The battery of claim 13, wherein the negative material is lithium titanium oxide.

17. The battery of claim 13, wherein the electrode area ratio is approximately one.

18. The battery of claim 13, wherein the electrode capacity ratio is approximately one.

19. The battery of claim 13, wherein the wherein:
the electrode area ratio is approximately one;
the electrode capacity ratio is approximately one; and
the negative active material has a particle size of approximately one microns or greater.

20. The battery of claim 19, wherein the negative active material has a particle size of approximately three microns.

21. A battery, comprising:
a positive electrode, including a positive active material, the positive electrode having a positive electrode area and a positive electrode capacity;
a negative electrode, including a negative active material and an electron conductive material;
the negative active material being particulate, and having an average particle size of at least one micron;
the negative electrode having a negative electrode area and a negative electrode capacity; and
an electrolyte, the electrolyte being a molten salt electrolyte including a lithium salt, the battery being a rechargeable lithium-ion battery,
the battery having an electrode area ratio equal to the positive electrode area divided by the negative electrode area, the electrode area ratio being at least approximately one,
the battery having an electrode capacity ratio equal to the positive electrode capacity divided by the negative electrode capacity, the electrode capacity ratio being at least approximately one.

22. The battery of claim 21, wherein the negative active material is lithium titanium oxide.

23. The battery of claim 21, wherein the particle size of the negative active material is approximately 3 microns.

24. The battery of claim 21, wherein the positive active material is lithium cobalt oxide.

* * * * *

UNITED STATES PATENT AND TRADEMARK OFFICE
CERTIFICATE OF CORRECTION

PATENT NO. : 7,267,908 B2  Page 1 of 1
APPLICATION NO. : 11/214159
DATED : September 11, 2007
INVENTOR(S) : Wen Li et al.

It is certified that error appears in the above-identified patent and that said Letters Patent is hereby corrected as shown below:

Title Page item 54 and col. 1.
    Title, Replace, "In cycling" with --Improvement cycling--

Signed and Sealed this

Twenty Second Day of April, 2008

JON W. DUDAS
*Director of the United States Patent and Trademark Office*